US006525313B1

(12) United States Patent
Park

(10) Patent No.: US 6,525,313 B1
(45) Date of Patent: Feb. 25, 2003

(54) METHOD AND APPARATUS FOR AN ELECTROSPRAY NEEDLE FOR USE IN MASS SPECTROMETRY

(75) Inventor: Melvin A. Park, Billerica, MA (US)

(73) Assignee: Brucker Daltonics Inc., Billerica, MA (US)

( * ) Notice: Subject to any disclaimer, the term of this patent is extended or adjusted under 35 U.S.C. 154(b) by 0 days.

(21) Appl. No.: 09/639,531

(22) Filed: Aug. 16, 2000

(51) Int. Cl.[7] .......................... H01J 49/00; B01D 59/44

(52) U.S. Cl. ....................... 250/281; 250/288; 250/425; 250/287

(58) Field of Search ................................ 250/281, 288, 250/287, 289; 210/198.2

(56) References Cited

U.S. PATENT DOCUMENTS 3,583,663 A * 6/1971 Snow, Jr. ..................... 248/71
4,358,302 A * 11/1982 Dahneke ..................... 239/424
4,861,988 A * 8/1989 Henion et al. .............. 290/288
5,115,131 A * 5/1992 Jorgenson et al. .......... 250/288
5,170,053 A * 12/1992 Hail et al. ................... 250/288
5,306,412 A * 4/1994 Whitehouse ............ 204/299 R
5,641,919 A * 6/1997 Dahneke ...................... 250/287
6,207,955 B1 * 3/2001 Wells et al. ................ 250/288
6,245,227 B1 * 6/2001 Moon et al. ............. 210/198.2

* cited by examiner

*Primary Examiner*—Jack Berman
*Assistant Examiner*—Kalimah Fernandez
(74) *Attorney, Agent, or Firm*—Ward & Olivo

(57) ABSTRACT

The present invention relates to a spray needle for use in electrospray ionization (ESI) for mass spectrometry. A spray needle is disclosed which is constructed to have an opening along its length such that a sample solution may be more readily introduced or loaded therein. Further, the design of the spray needle of the invention is more durable than the prior art spray needles and may be reusable. Because sample loading is more readily achieved, the spray needle of the invention is appropriate for use with a fully automated system for the analysis of samples.

77 Claims, 9 Drawing Sheets

METHOD AND APPARATUS FOR AN ELECTROSPRAY NEEDLE FOR USE IN MASS SPECTROMETRY

TECHNICAL FIELD OF THE INVENTION

The present invention relates generally to electrospray ionization for mass spectrometry, and more particularly the invention relates to an apparatus and method for producing an electrospray from a sample solution for introduction into mass spectrometer.

BACKGROUND OF THE PRESENT INVENTION

Mass spectrometry is an important tool in the analysis of a wide range of chemical compounds. Specifically, mass spectrometers can be used to determine the molecular weight of sample compounds. The analysis of samples by mass spectrometry consists of three main steps—formation of gas phase ions from sample material, mass analysis of the ions to separate the ions from one another according to ion mass, and detection of the ions. A variety of means exist in the field of mass spectrometry to perform each of these three functions. The particular combination of means used in a given spectrometer determine the characteristics of that spectrometer.

The present invention relates to the first of these steps the formation of gas phase ions from a sample material. More particularly, the present invention relates to electrospray ionization (ESI), one such means for producing gas phase ions from a sample material. Electrospray ionization, was first suggested by Dole et al. (M. Dole, L. L. Mack, R. L. Hines, R. C. Mobley, L. D. Ferguson, M. B. Alice, *J. Chem. Phys.* 49, 2240, 1968). Generally, in the electrospray technique, analyte is dissolved in a liquid solution and sprayed from a needle. The spray is induced by the application of a potential difference between the tip of the needle and a counter electrode. Specifically, a voltage of several kilovolts is applied between, for example, a metal capillary and a flush surface separated by a distance of approximately 20 to 50 millimeters. Under the effect of the electric field, a liquid in the capillary is dielectrically polarized at the end of the capillary. The liquid is then pulled out into a cone, known as the Taylor cone. The surface tension of the liquid at the pointed end of the cone is no longer able to withstand the attraction of the electric field, and this causes a small electrically charged droplet to be detached. The charged droplet flies with great acceleration to the flush counter electrode, effected by the inhomogeneous electric field. During the flight of the liquid, evaporation occurs and the droplets are slowed down. The spray results in the formation of finely charged droplets of solution containing analyte molecules. The larger ions become ionized, and move towards the counter electrode to be transferred into the vacuum system of a mass spectrometer, for example, through a narrow aperture or capillary very large ions can be formed in this way. For example, ions as large as 1 MDa have been detected by ESI in conjunction with mass spectrometry (ESMS).

Electrospray, as in the present invention, facilitates the formation of ions from sample material. It should be noted that the size of the droplets produced in the ESI technique is dependant upon the size of the sprayer used. The terms nanospray or micro spray are used to indicate the use of very small sprayers in electrospray technique. In other words, a sprayer having an opening of less than about 10 $\mu$m (microns) will produce a nanospray, a sprayer having an opening of between approximately 10–100 $\mu$m (microns) will produce a micro spray, and a sprayer having an opening of greater than 100 $\mu$m (microns) will produce an electrospray. For convenience, all three are referred to generally as "electrospray," in as much as the present invention can be used with each.

Referring to FIG. 1, depicted is an ionization source of co-pending application Ser. No. 09/570,797 which shows an API source for generating ions from a sample for subsequent analysis. As shown, the ionization source 101 comprises spray chamber 1, transfer region 2, first pumping region 5, second pumping region 4, hinge 9, flange 10, and source block 16. During normal operation of the ionization source 101 incorporating an ESI source it is anticipated that numerous other elements may be used within ionization source 101 as shown in FIG. 1. These may include vacuum pump 15, ion transfer devices such as capillary 6 having an entrance end 7, and exit end 19 and inner channel 8, multipole devices such as pre-hexapole 11 and hexapole 12, as well as other ion optic devices such as skimmers 13 and 14 and exit electrodes 17.

Initially, sample solution is formed into droplets at atmospheric pressure by spraying the sample solution from a spray needle 20 into spray chamber 1. The spray may be induced by the application of a high potential between the tip of spray needle 20 and the capillary entrance end 7 within spray chamber 1. Then, these sample droplets evaporate while in the spray chamber 1 thereby leaving behind sample ions. These sample ions are accelerated or directed toward capillary entrance 7 and into channel 8 by the electric field generated between spray needle 20 and capillary entrance 7. These ions are then transported through capillary 6 to capillary exit 19, due to the flow of gas created by the pressure differential between spray chamber 1 and first transfer region 2.

The present invention relates particularly to the sprayers used within electrospray ionization. Presently, known electrospraying techniques teach that it is necessary to take active steps to ionize the solution for analysis in the mass spectrometer. For instance, FIG. 2 depicts a typical prior art electrospray needle 21. As shown, needle 21 comprises an elongated capillary structure tapered at one end to form tip 22. Needle 21 includes a plenum 24 to receive the liquid sample. Plenum 24 is shown having an interval region larger than that of the capillary section of needle 21. Liquid sample flows from plenum 24 through upstream inlet 25 into the capillary section of ejection through tip 26. Plenum 24 may be electrically conductive so that a voltage applied to the plenum 24 will allow for the transfer of charge into the liquid stream. Alternatively, a charge can be imposed on the capillary section of needle 21. The applied voltage produces an electrical field which is arranged such that it is at its highest at the tip 26 such that the charge and field at tip 26 are high enough to form the electrospray (i.e. charged droplets) . Such a prior art apparatus consists only of a single needle which, is a very thin capillary, producing flow rates on the order of 20 nL/min. Further, such a needle must be loaded through its back end (i.e. the plenum 24, as shown in FIG. 2), not through the tip 25. This can be a very time consuming process.

Typically, nanospray needles are produced by taking a glass capillary having a relatively large diameter and pulling and/or machining it to a tip. Then a metal coating is vapor deposited onto its outer surface, as disclosed in Mann U.S. Pat. No. 5,504,329 (Mann). The needle shown in FIG. 3 is the result of such a process. Needles such as this are formed by using heat to soften glass capillary tubing and pulling the tip end to form the needle's tapered tip 27. These needles are generally single use, and must be loaded with sample solution using micropipettes or some other means for loading sample solution through the end 28 of the needle—the end opposite the spray tip—using a micropipette.

Such needles are generally single use, and require the sample to be reloaded through its back end after each use. The prior art needles breed inaccuracy because the conditions have to be replicated with each removal and replacement. In addition, the fragile nature of the needles, combined with their limited use, makes replacement costs a significant expense for their users. Also, because these needles are extremely fragile, replacement is frequent, which is both costly and time consuming.

Once these prior art needles are formed, a means of making electrical contact is required. Prior art needles have been made from small metal tubing (e.g., a steel syringe needle) or dielectric tubing (e.g., glass, fused silica or polymer tubing). If the needle is made of an insulating material, there are generally three ways that the prior art teaches to make a needle capable of electrical contact: (i) applying thin metal films directly onto the dielectric tubing, (ii) supporting the dielectric tip inside a secondary metal tube that contacts the liquid as it exits the dielectric tubing and (iii) making a direct electric contact with the solution from a remote position. The most commonly used of these is the application of a thin metal film (e.g., gold or platinum) directly onto the dielectric tubing.

However, due to their relatively inert nature, such metals often show poor adhesion to the substrate materials, which reduces ESI stability and eventually leads to ESI tip failure. As the analyte is sprayed from the tip, the metal coating can rapidly deteriorate through peeling or flaking. An attempted solution to this problem has been to apply an interlayer material, such as chromium or sulfur containing silanes; which adheres to both the metal and the substrate. However, this has not entirely solved the problem because such interlayer materials are subject to chemical attack (i.e., dissolution, in the case of chromium, or bond cleavage, in the case of silanes).

Valaskovic U.S. Pat. No. 5,788,166 (Valaskovic), for example, uses a process of applying a metal overcoating on a dielectric capillary needle. The capillary needle is constructed by heating fused-silica tubing with a laser, then pulling the tube until its internal diameter is in the range of 3 μm. The pulling process is followed by chemical etching and surface metallization. The pulling results in formation of slowly tapered capillary edges and a tip having a very small inner diameter. The chemical etching process forms the tapered outer wall and a sharp point at the tip of the needle. The surface metallization applies a thin metal contact layer on the outer wall of the needle, to allow for electrical contact. Then an electrically insulating overcoat is applied. The overcoat essentially fixes the conductive metal contact layer into place, although the electrically insulating overcoat does not improve the adhesion of the metal to the capillary.

Because the pulling process is used on fused silica tubing, the extra step of metallization is required. The pulling process results in slowly tapered edges, which culminate in a sharp point. This point is then etched to create a narrow diameter opening at the distal end (or tip) of the pulled tubing (i.e., forming a needle). A needle such as this has the disadvantage of the formation of "bubbles" in the solution within the needle, which interferes with the spray of the solution—in fact, it may even stop flow of the solution from the needle. In other words, having such a narrow diameter at the distal end (or tip) of the needle permits air pockets to form at the base of the tip. That is, solution near the distal end may begin to evaporate, thereby forming air pockets. These air pockets then permeate through the solution toward the proximal end (due to the larger space available), effectively "blocking" the spray of solution from the needle. The glass structure of the needle also contributes to the formation of these air pockets, as the solution is held within the needle due to capillary action. In other words, the solution grips the inner surface of the needle as the air pockets permeate through the interior of the needle.

Other forms of electrospray include pneumatic assisted, thermal assisted, or ultrasonic assisted, or the addition of arc suppression gases so that higher voltages can be applied during electrospray formation. Pneumatically assisted sprayers typically have a much larger tip (greater than 100 μm) than, for example, nanosprayers (around 5 μm) (See FIG. 4 for an example of a nanospray needle). When using pneumatically assisted sprayers, sample solution is typically pumped (for example, via a syringe pump) into the sprayer. Sample aliquots can then be injected into this solution stream either manually or automatically (i.e., by a robot or other machine). However, the conventional process of injecting sample into sprayers by machines is cumbersome, as the process is difficult to control. That is, filling the needle through its proximal end is not practical—since the opening at the proximal end is so small. The glass capillary, with the opening at the end, provides a measure of resistance during filling, and therefore must be performed carefully with a micropipette.

Accordingly, prior to the present invention, a need has existed for a multiple use, robust, spray needle and sprayer having a geometry that eases the elimination of voids or bubbles. It is a purpose of the invention to provide such a spray needle and sprayer, as well as a method of operating a mass spectrometer using a spray needle and sprayer to produce an electrospray formed from a sample solution. It is also a purpose of the present invention to provide a means and method of operating a mass spectrometer which utilizes the apparatus with a variety of ionization techniques (i.e., ESI, MALDI, etc.)

SUMMARY OF THE INVENTION

One aspect of the present invention is to provide an apparatus and method of facilitating the introduction of a liquid sample into a mass spectrometer for subsequent analysis. To address the foregoing problems, the present invention provides a sprayer which is reusable, robust, and easy to load. Furthermore, the present invention provides a spray needle and sprayer which has a geometry that minimizes the formation of voids or bubbles, thereby providing improved results in the analysis of the sample solution, as demonstrated in the mass spectra of FIG. 10 obtained in a mass analysis performed using the spray needle according to the preferred embodiment disclosed herein.

Specifically, one embodiment of the present invention comprises a two component spray needle (i.e., a support and a tip). Advantages of a spray needle having this configuration include ease of sample loading, minimization of bubble formation or voids, durability, reusability, ease of automation, ease of replacement, increased reproduction of analysis results, etc. For example, if after repeated uses the tip is no longer functional, a new tip may be constructed, and attached to the intact support.

Another embodiment of the present invention provides a single component spray needle and sprayer having an opening along its length to facilitate the introduction or loading of a sample solution into the needle. In other words, the spray needle can be filled with the solution through its an elongated slit along its length by merely dipping the needle into the sample solution. This allows for the liquid to be drawn in through the tip into the body of the spray needle via capillary action. At the same time, this may limit the droplet size upon ejection of the sample from the needle. The opening also provides for unique spraying capabilities due to its geometry and length. Furthermore, because the spray needle does not need to be loaded via the rear opening (or proximal end), the spray needle can be easily employed within automated systems.

Yet another embodiment of the present invention comprises a single unit spray needle having a slit along its length as well as having the tip end diagonally cut (as shown in FIGS. 7A–7C). The construction of this embodiment provides a robust needle which facilitates the introduction of sample solution into the spray needle through its proximal end (or tip) as well as facilitates the production of very small sample droplets for ionization. In addition, the spray needle of this embodiment can be loaded through a dipping process, making it ideal for use with an automated process. The needle of this embodiment also minimizes the formation of bubbles or voids in the sample solution.

Yet a further embodiment of the invention comprises a multitip spray needle (as shown in FIGS. 11A–C). Such a spray needle preferably embodies the structure of the preferred embodiment shown in FIGS. 5A–C, but alternatively, may embody the alternative structures shown in FIGS. 6A–C and 7A–C. Specifically, a multi-tip spray needle according to the invention may comprise a plurality of (e.g., 20, 50, 100, etc.) very fine (i.e., on the order of 50 $\mu$m or less) elements at the needle's distal end. An advantage of such a multi-tip structure is the facilitation of the spray of extremely fine droplets, having the effect of maximizing the introduction of sample ions into the mass analyzer from the source region.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF A PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment (as well as some alternative embodiments) of the present invention.

Figure 1:
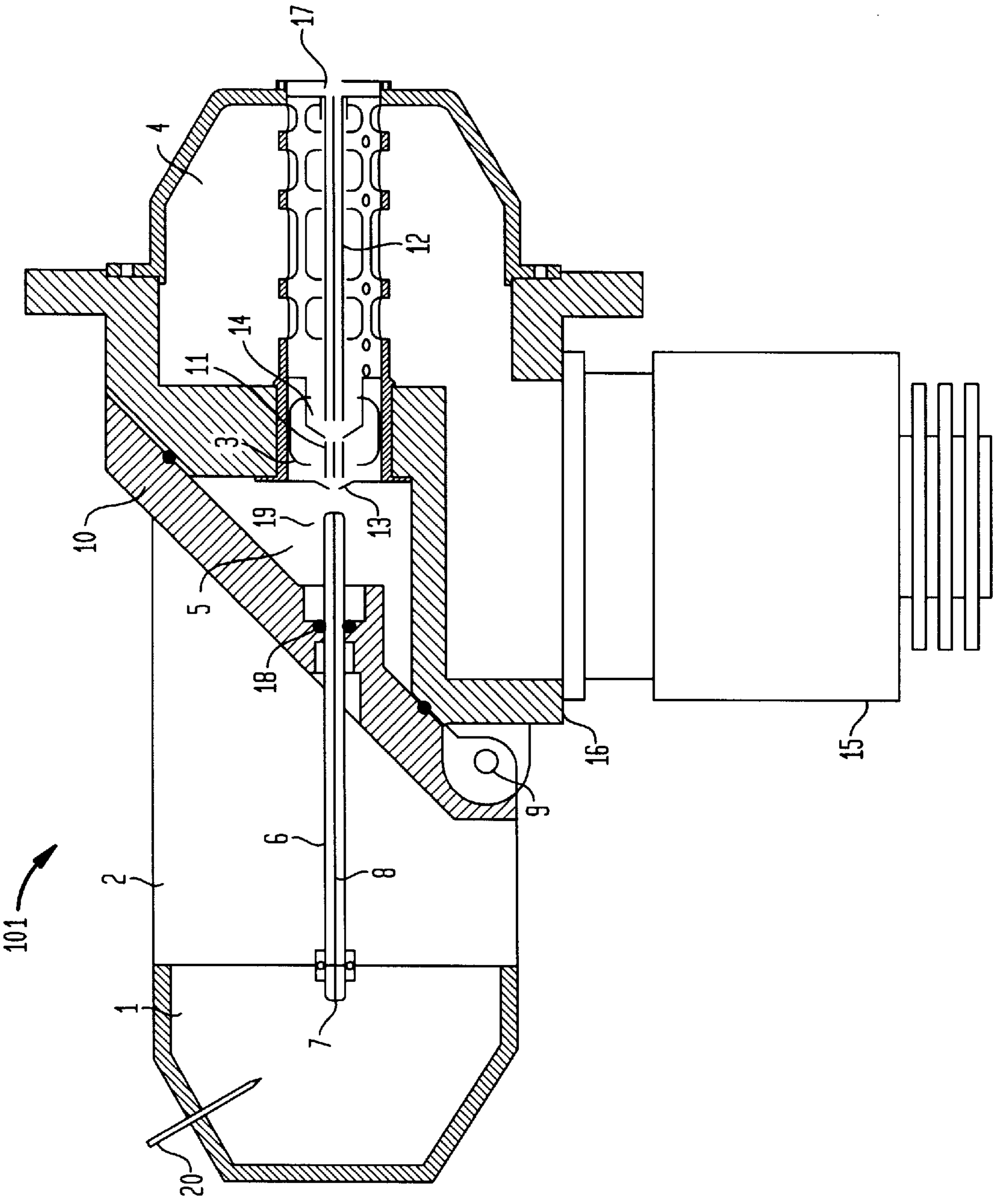
FIG. 1 depicts an atmospheric pressure ionization (API) source block for introducing ions from an ionization source (e.g., ESI, etc.) into a mass analyzer for subsequent analysis.
Figure 2:
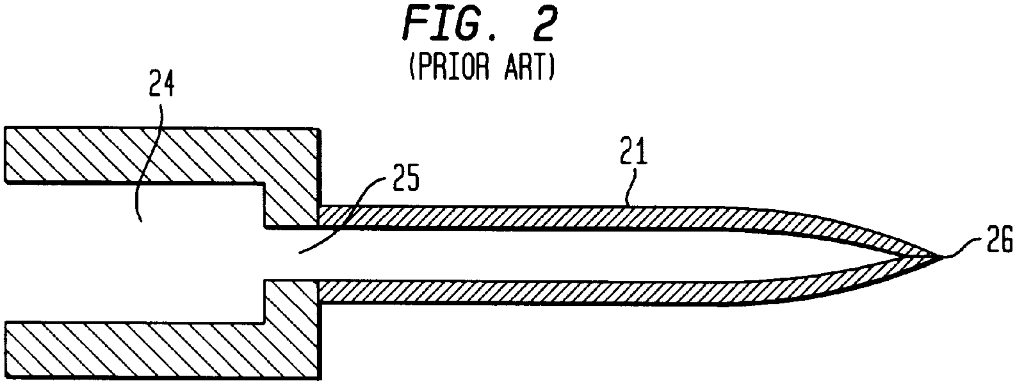
FIG. 2 (PRIOR ART)
FIG. 2 shows a lengthwise cross-sectional view of a prior art nanospray needle as shown in Myers U.S. Pat. No. 5,975,426.
Figure 3:
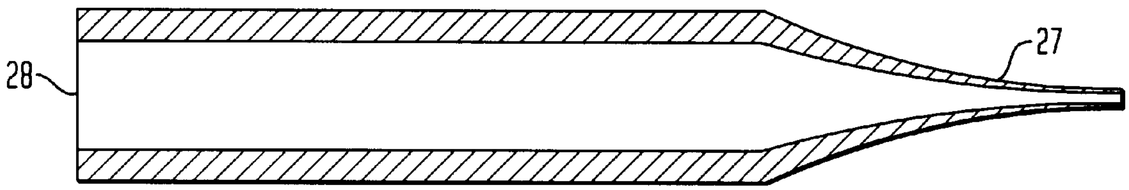
FIG. 3 (PRIOR ART)
FIG. 3 shows a lengthwise cross-sectional view of a prior art nanospray needle according to Mann U.S. Pat. No. 5,504,329.
Figure 4:
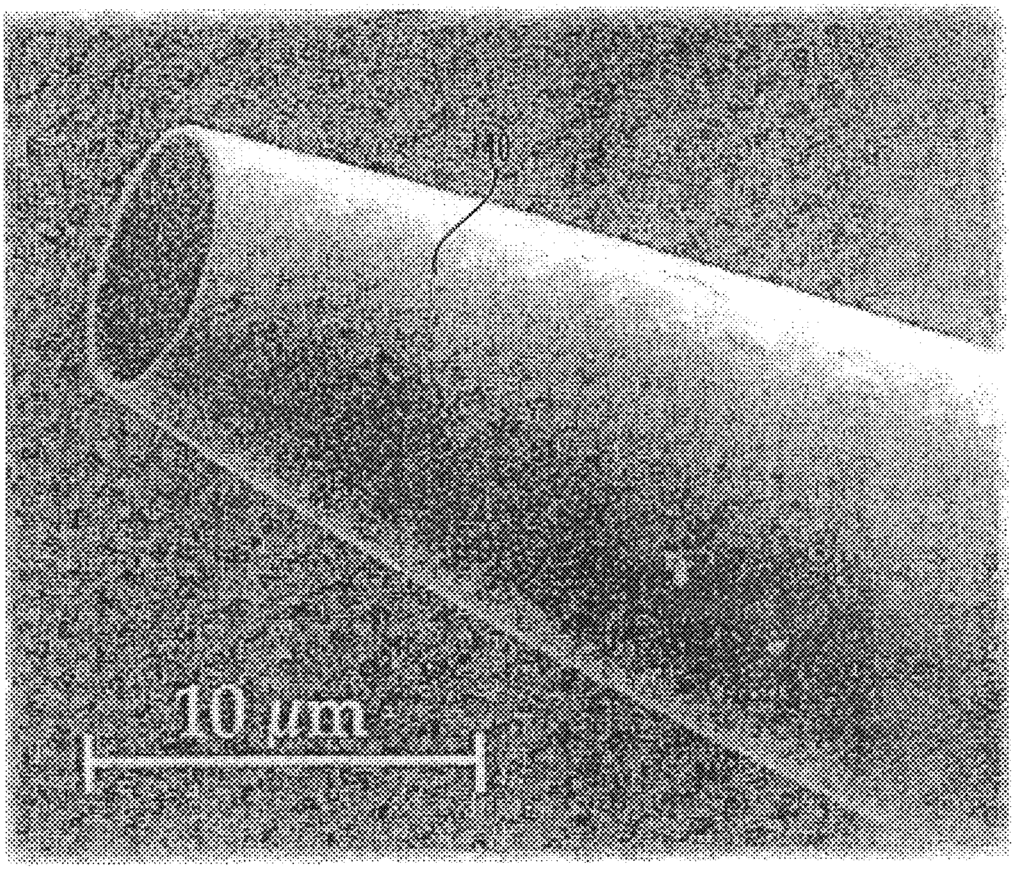
FIG. 4 (PRIOR ART)
FIG. 4 is a microphotograph showing a prior art nanospray needle.
Figure 5A:
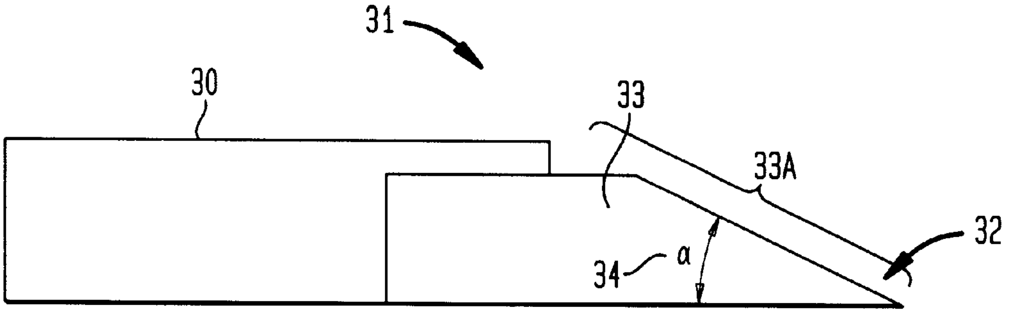
FIG. 5A shows a side view of a preferred embodiment of a spray needle according to the present invention.

Referring initially to FIG. 5A, shown is a side view of a preferred embodiment of spray needle 31 according to the present invention. As shown, spray needle 31 according to the preferred embodiment of the invention comprises two component parts, support 30 and foil 33.

Figure 5B:
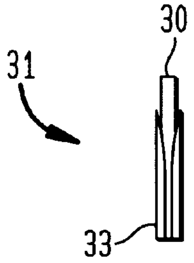
FIG. 5B shows an end view of the spray needle depicted in FIG. 5A.

Support 30 is preferably constructed from a rigid and electrically conductive material (e.g., steel, etc.). It is also preferred that the support 30 be a solid yet thin structure (i.e., on the order of 400 μm or less in thickness). The thickness of the support contributes to the determination of the loading and spray properties of the sprayer (i.e., how fast the solution will flow into the sprayer, the potential at which the sprayer must be operated, the optimal distance between the sprayer and ESI orifice, and the solution flow rate during spray etc.), because the thickness of support 30 determines the size of foil 33. It is further preferred, as shown in FIG. 5B, that support 30 have a rectangular cross section. This geometry eases the elimination of voids or bubbles which interfere with the spray of the solution. Alternatively, support 30 may have a different cross-sectional shape (e.g., triangular, circular, hexagonal, etc.). Such change in the shape of support 30, however, may alter the spray properties of the sprayer. Thus, different structures may be ideal for different sample solutions.

Figure 5C:
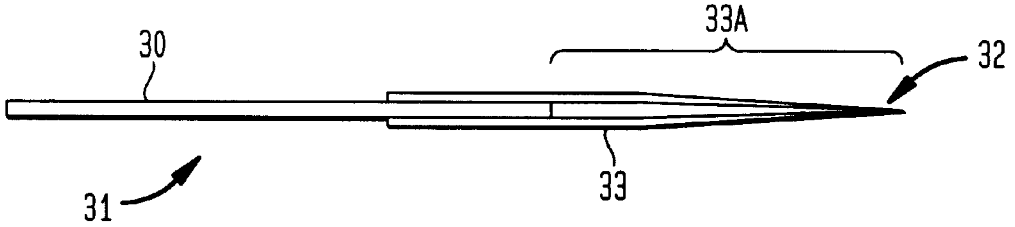
FIG. 5C shows a top plan view of the spray needle depicted in FIG. 5A.

Generally, foil 33 may be constructed using a piece of electrically conducting "foil" which is cut at an angle α, as shown in FIG. 5A. In the preferred embodiment, the foil 33 is attached to the outer surface of support 30 and is in direct contact with a portion of one end of support 30, as depicted in FIGS. 5A and 5C. Foil 33 is attached such that it is in electrical contact with support 30. Preferably, an adhesive is used to attach foil 33 to support 30, but other means for attaching the foil 33 to support 30 may be used, such as soldering. Foil 33 is preferably constructed from a chemically inert and easily cleaned material (e.g., gold, copper, platinum, stainless steel (because of its limited reactivity to certain compounds), etc.). For example, certain species are not readily protonated, but will accept, for example, silver or copper ions as adducts. Therefore, use of such different materials for foil 33 may alter the life and spray properties of the spray needle 31 (i.e., durability, sample loading flow rate, the potential at which the spray needle must be operated, the optimal distance spray needle 31 is positioned from the capillary orifice (see FIG. 9), the spray flow rate, etc.)

Alternatively, other materials might be used in the construction of foil 33, depending on the particular electrochemical or reactive properties desired. For example, the utilization of copper instead of gold as the material for foil 33 will result in the formation of copper ions, and has the potential for forming complexes with analyte species. Some of such complexes have been known to enhance signal intensity in certain analyses.

Preferably, foil 33 is constructed from a very thin piece of metal (i.e., about 100 μm in thickness). However, the thickness of foil 33 may be chosen such that needle 31 obtains certain properties (i.e., durability, formation, spray type, etc.). In fact, the choice of thickness of foil 33 may depend on the material from which foil 33 is constructed (e.g., gold, copper, etc.).

In the preferred embodiment of the spray needle 31 of the present invention as shown in FIGS. 5A–5C, tip 32 may be formed by wrapping or folding a portion of foil 33 around a portion of support 30 and adhering foil 33 to support 30. Once wrapped or folded, the exposed end of foil 33 is preferably cut at an angle α 34, as shown in FIG. 5A, thereby forming tip 32. Foil 33 is preferably attached to support 30 in such a way that it conforms to the shape of support 30 (e.g., if support 30 is rectangular, then foil 33 would conform to this rectangular shape (i.e., it would resemble a straight edged 'U' shape)).

Alternatively, support 30 may comprise an opening on one of its ends for accepting an end of foil 33 and securing foil 33 therein. Among other things angle α 34 and the thickness of foil 33 each contribute to the determination of the loading and spray properties of the sprayer (i.e., the rate at which the solution will flow into the sprayer, the potential at which the sprayer must a be operated, the optimal distance between the sprayer and ESI orifice, and the solution flow rate is during spray, etc.)

Preferably, angle α 34 is approximately 45 degrees. This provides optimum performance of the spray needle 31 during operation. Of course, angle α 34 may be any angle between zero and ninety degrees, but importantly, the specific angle α 34 used will affect the properties and/or performance of spray needle 31. Specifically, angle α 34 aids in determining the flow rate of the spray, and, in turn, the accuracy and exactness of the mass analysis results. Also, choice of angle α 34 for optimum results may vary in accordance with the sample or technique being used, the material used for foil 33, the potentials being applied, the distance between the needle 31 and the ESI orifice, etc.

Of course, the relative dimensions of support 30 and foil 33 may differ from that shown in FIGS. 5A–C. Specifically, the geometry of support 30 (and therefore the assumed geometry of foil 33 when attached to support 30) may differ from the geometry of foil 33 at the spraying end. For example, foil 33 at support 30 as shown in FIG. 5A, is rectangular, while foil 33 at tip 32 may be slightly "crushed" so as to produce a gap narrower than the thickness of support 30. Although this may reduce the solution flow rate throughout the sample loading and spray process, it will importantly allow for the spray of smaller droplets of the sample solution during the ESI process and result in enhanced performance of the ESI.

The construction of the apparatus and attachment of foil 33 to support 30 is unique because the opening in the resulting invention is along the length. This allows sample to be loaded into the needle 31 anywhere along the aperture (as indicated by 33A) along its length by a simple dipping process. Further, the needle 31 maintains the ability to produce very small droplets (or larger ones), can be extremely robust, is reusable, convenient for use in fully automated systems, etc.

More specifically in the preferred embodiment shown in FIGS. 5A–C, the sample solution may be loaded into needle 31 aperture 33A. To load the sample, the invention may be held vertically, and tip 32 lowered into a sample solution. The sample solution will be drawn into foil 33 via capillary action, thereby filling the internal cavity within foil 33 (created when foil 33 is wrapped or folded around support 30). Due to the case of filling foil 33 with sample, and its heightened durability over prior art needles, the invention may be repeatedly cleaned and reused.

This reusability, coupled with the geometric structure of the needle (which eases the elimination of interfering voids or bubbles) may be especially important in an alternative embodiment which utilizes the invention for the fully automated analysis of samples in conjunction with a robot. Another variation uses the invention to accomplish sequential analysis of a multitude of samples.

Figure 10:
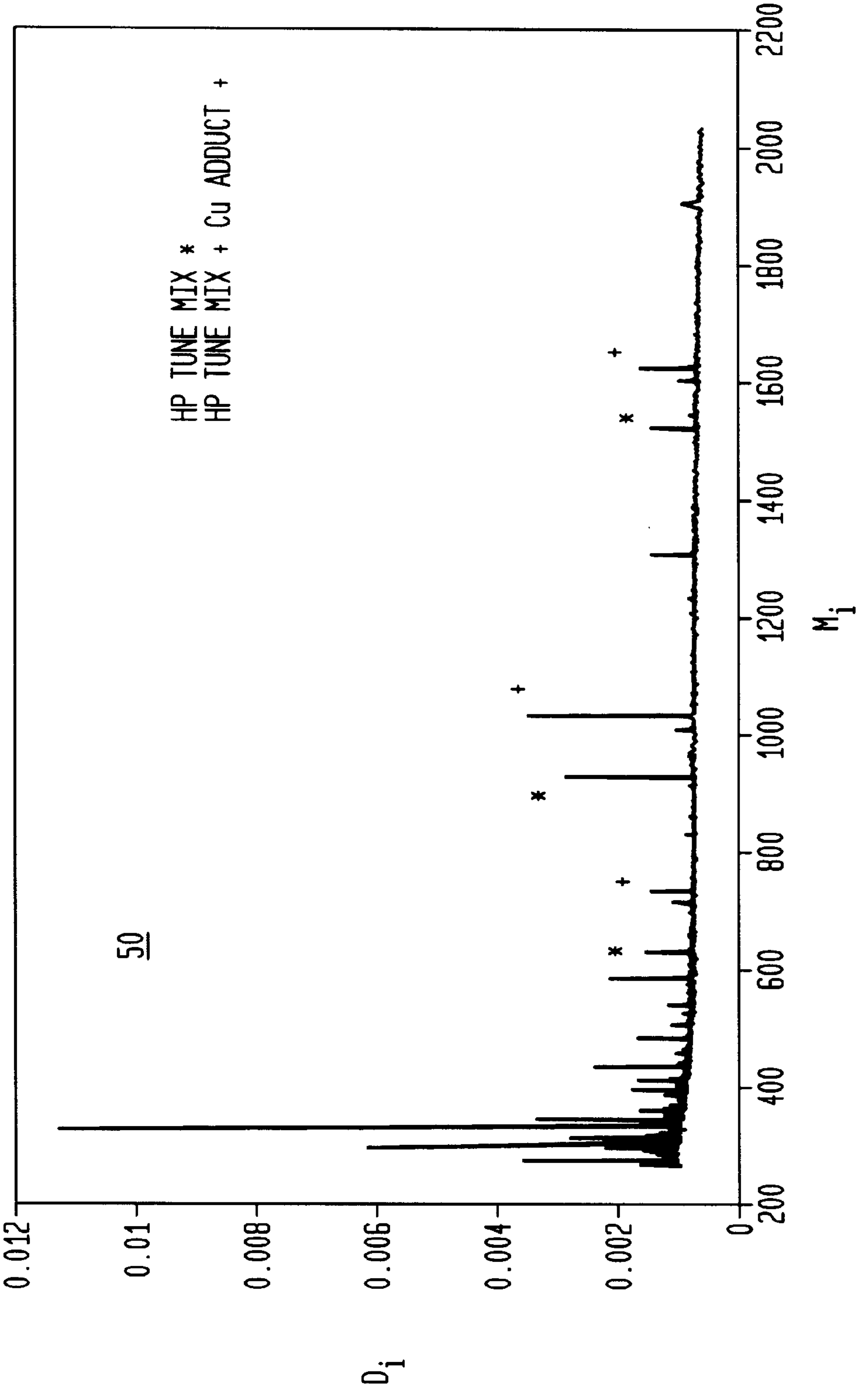
FIG. 10 shows a mass spectra obtained in a mass analysis performed using the spray needle of FIGS. 5A–C in accordance wit the present invention.

Importantly, use of a spray needle according to the preferred embodiment disclosed herein provides improved results in the analysis of a sample solution, as demonstrated by the mass spectra 50 shown in FIG. 10 obtained in a mass analysis performed using the spray needle according to the preferred embodiment.

Figure 6A:
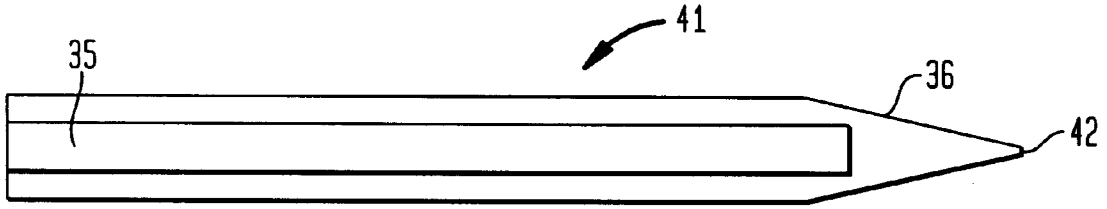
FIG. 6A shows a top plan view of an alternate embodiment of the spray needle in accordance with the present invention.
Figure 6B:
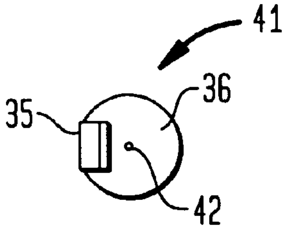
FIG. 6B shows an end view of the spray needle shown in FIG. 6A.
Figure 6C:
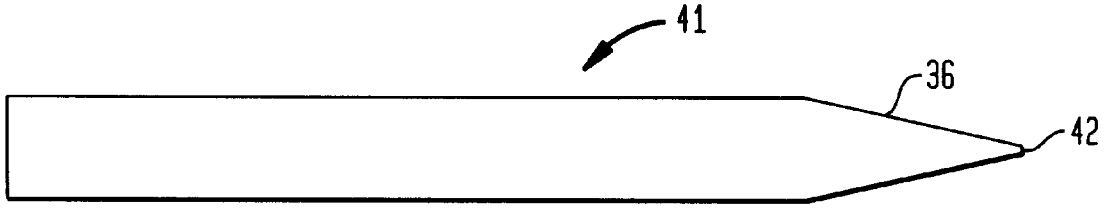
FIG. 6C shows a side view of the spray needle shown in FIG. 6A.

Referring next to FIGS. 6A–6C, shown is an alternate embodiment of a spray needle 41 in accordance with the present invention. In particular, shown in FIG. 6A is a top plan view of spray needle 41 comprising an elongated structure having an inner channel there through. Spray needle 41 further includes a tapered end 36 which culminates into an opening at tip 42. This embodiment of the invention further comprises an opening 35 (or slit) which extends along substantially the entire length of needle 41 (i.e., from tapered end 36 all the way to the other end of needle 41). Of course, optionally, the opening 35 may extend for only a short part of needle 41. Also, opening 35 may be a series of holes or openings aligned lengthwise along needle 41 rather than a single continuous slit, as shown. Opening 35 (or a series of openings) provides the user with an improved method of loading the sample solution into the spray needle, as well as providing a variety of options as to controlling the spray of the sample from the needle. For example, opening 35 provides a greater area for the sample to be drawn into the spray needle 41, and therefore enhances the loading characteristics and abilities of needle 41. That is, needle 41 may be loaded quickly and efficiently, allowing the user to load sample via an automated process.

As shown, needle 41 is preferably cylindrical in structure. Of course, other structures may be used (i.e., rectangular, square, triangular, etc.). It is also preferred that needle 41 be constructed from a solid, yet thin material (i.e., on the order of 400 $\mu$m or less in thickness). It is also preferred that needle 41 include an opening at tip 42 having a diameter (if needle 41 is cylindrical) of between about 20 $\mu$m and 50 $\mu$m. Alternatively, needle 41 may be used in an nanospray ionization source, and therefore would preferably include an opening at tip 42 having a diameter (if needle 41 is cylindrical) of approximately 5 $\mu$m. As the above demonstrates, the opening in tip 142 determines the spray properties of the needle (i.e., flow rate etc.).

Figure 7A:
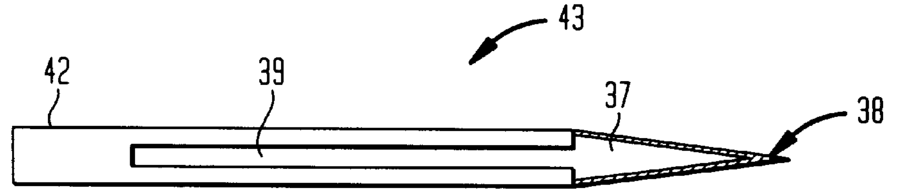
FIG. 7A shows a top plan view of another alternate embodiment of the spray needle according to the present invention.
Figure 7B:
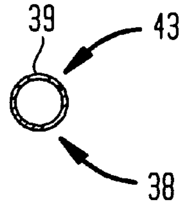
FIG. 7B shows a side view of the spray needle shown in FIG. 7A.
Figure 7C:
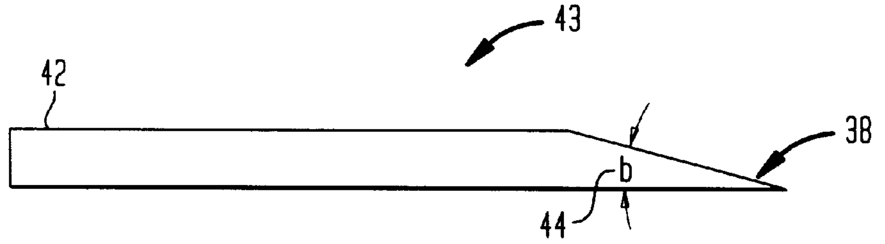
FIG. 7C shows an end view of the spray needle shown in FIG. 7A.

Turning next to FIG. 7A, shown is a top plan view of yet another alternate embodiment of a spray needle according to the t present invention. Specifically, shown is spray needle 43 comprising an elongated body 42 (shown here as being cylindrical, but other shapes may be used) having an inner channel therethrough. Spray needle 43 further includes an opening 39 along the length of body 42 is cut at an angle b 44 (as shown in FIG. 7C) such that a substantial opening 37 is created at the spray end of needle 43. Also, opening 37 is such that a narrow sharp tip 38 is created at the end of needle 42. Tip 38 provides a means for distributing sample droplets in a variety of different sizes (i.e., a larger opening at tip 38 would produce larger droplets). For example, a high electric field maintained at tip 38 may result in the solution being discharged from tip 38 in the form of a Taylor Cone.

The embodiments of a spray needle according to the invention shown in FIGS. 5–7 may also be treated on the internal area of the spray end of the needle of FIGS. 5A, 6A or 7A with polypropylene or some other polymer coating. This treatment allows a needle to be more readily cleaned, while not interfering with the functionality of the needle. Further, this treatment makes the inner surface of the needles spray end inert with respect to the sample solution being tested and will therefore prevent any negative effects which may be caused by the substance used for the body of the needle (i.e., gold, copper, stainless steel, etc.).

Figure 8:
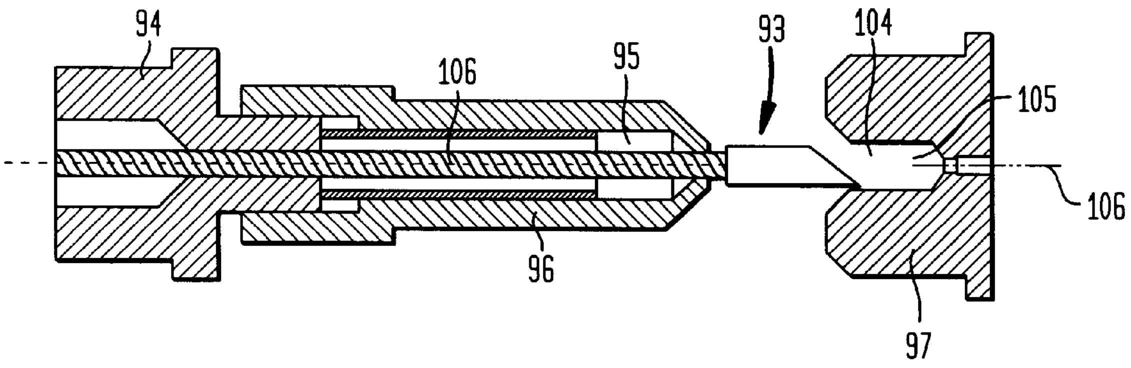
FIG. 8 depicts the electrospray needle shown in FIGS. 5A–C integrated within an electrospray assembly according to the present invention.
Figure 9:
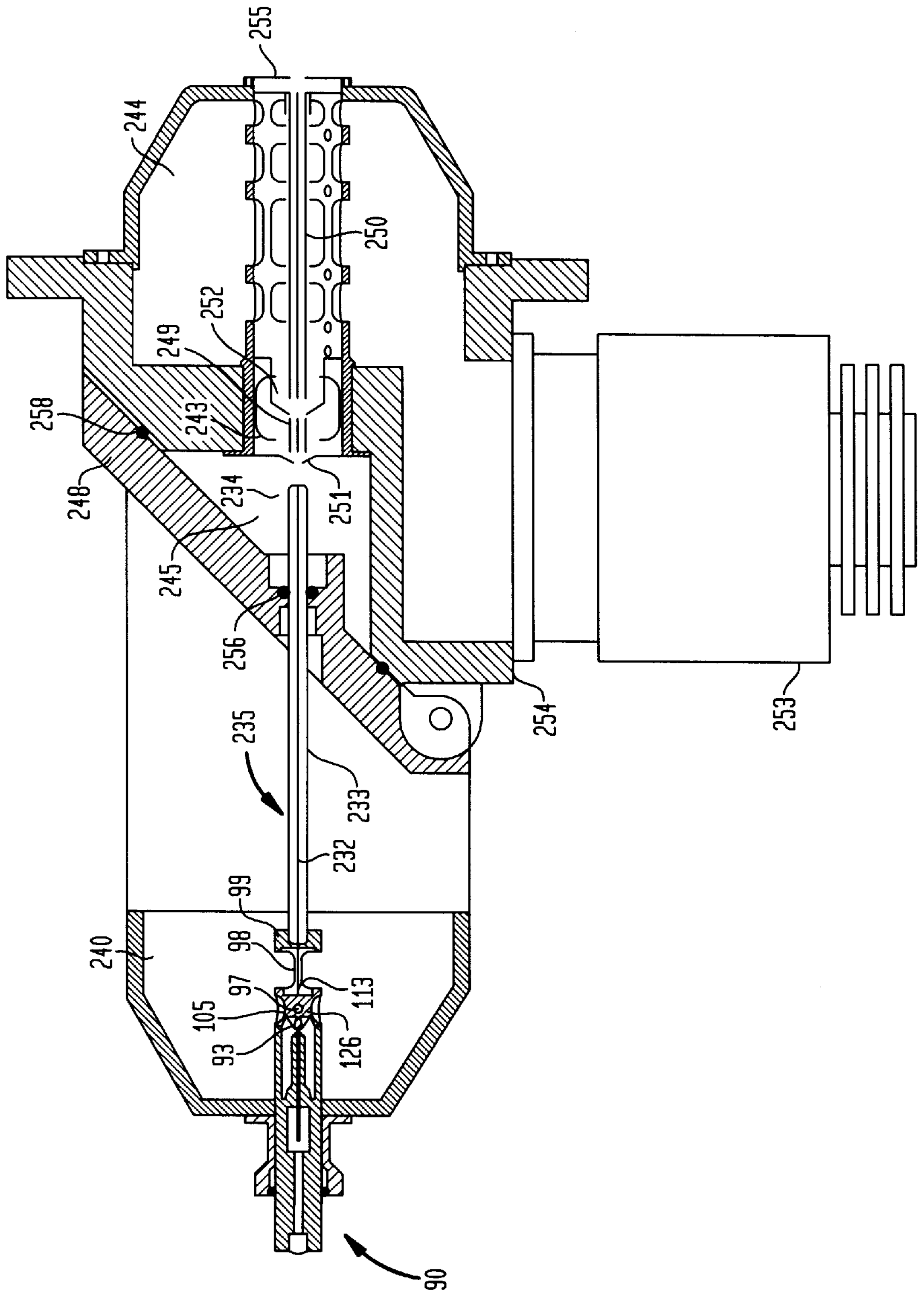
FIG. 9 depicts the electrospray assembly showing in FIG. 8 integrated into an ionization source block.

Turning next to FIG. 8, shown is one embodiment of the integration of the spray needle of FIGS. 5A–C within an electrospray assembly according to the present invention. Of course, similarly, the alternative embodiments of a spray needle according to the invention (i.e., as shown in FIGS. 6A–C, 7A–C and 11A–C) may be integrated with an electrospray assembly as shown in FIGS. 8 and 9. As shown, hole 105 in entrance cap 97 is designed especially to receive the tip of spray needle 93. During operation, spray needle 93 and entrance cap 97 are at different electrical potentials—by about 1000 V. It is this potential difference which induces the spray process. However, the strength of the field at tip 104 of spray needle 93 is of critical importance in producing a spray and subsequently ions. The potential difference between needle 93 and cap 97 might be 1000 V without inducing a spray. If needle 93 is too far from entrance cap 97 then the field strength at tip 104 of needle 93 will be too low and no spray will be formed. If needle 93 is to close to entrance cap 97 then an arc will form between needle 93 and cap 97—and no spray will be formed. Hole 105 of entrance cap 97 is designed to ease the positioning of needle 93 with respect to cap 97. Because hole 105 is cylindrical and significantly greater in length than in diameter, tip 104 of needle 93 can be located in a range of positions in hole 105 without great influence on the strength of the field at tip 104. That is, because hole 105 is cylindrical, there is a range of positions along the axis of hole 105 within which the distance between these positions and the nearest point on the surface of hole 105 is a constant. Assuming the potential difference between cap 97 and needle 93 is a constant, and the distance between tip 104 and cap 97 is a constant within the above mentioned range of positions, the strength of the field at tip 104 will also be a constant.

The positioning of needle 93 with respect to capillary section 98 (as seen in FIG. 9) is thus one dimensional (i.e., along the longitudinal axis 106 of needle 93). The position of needle 93 is fixed in the plane perpendicular to axis 106 by the mechanical alignment of components 91 through 100 in assembly 90. Along axis 106, there is a range of needle positions over which spray and ions are readily formed. It has been observed that needle 93 should extend approximately 7 mm (+/−1 mm), from the end of retainer 96 in order to provide a useable ion current.

The positioning of needle 93 is eased further in that needle 93 is positioned within assembly 90 independent of the remainder of the source and instrument. That is, to exchange spray needles and/or samples, assembly 90 is first extracted from the source. Then, on the bench, base 91—together with union 94, retainer 96, and needle 93—is extracted from assembly 90. Retainer 96 is loosened by partially unscrewing it thus allowing needle 93 to be removed. A new nanospray needle is produced or obtained from a manufacturer. Analyte solution is loaded into the new needle via micropipette from the distal end of the needle. The new needle 93 is then inserted into retainer 96 so that it extends about 7 mm, +/−1 mm, beyond retainer 96. Retainer 96 is then tightened, and base 91—together with union 94, retainer 96, and needle 93—is reinserted into cylinder 92 to complete assembly 90. Assembly 90 is finally reinserted into the source.

An embodiment of the complete assembly 90, as inserted into spray chamber 240, is depicted in FIG. 9. Notice that spray chamber cover 107 includes a number of ports, three of which—108, 109, and 110—are shown. This spray chamber is designed in accordance with co-pending application IONIZATION CHAMBER FOR ATMOSPHERIC PRESSURE IONIZATION MASS SPECTROMETRY. Further, adapter 111 with electrical contact spring 112 is fitted over port 109. Nanospray assembly 90 is inserted through adapter 111 and port 109 until finally coming into contact with and fitting over capillary section 233. At this point o-ring 100 forms a seal between capillary section 233 and union 99. In this way multiple part capillary 235 is formed from capillary sections 98 and 233 in accordance with copending application METHOD AND APPARATUS FOR A MULTIPLE PART CAPILLARY DEVICE FOR USE IN MASS SPECTROMETRY. Notice that assembly 90 can be inserted and extracted from spray chamber 240, without tools, by simply pushing and pulling respectively assembly 90 through port 109 along axis 106.

When inserted into spray chamber 240, nanospray assembly 90 is supported on one end by adapter 111 and port 109 and is supported on the other end by capillary 233. In the preferred embodiment, cover 107 is electrically grounded by contact with the rest of the source (not shown). Adapter 111 is grounded by contact with cover 107. And base 91—together with union 94, spray needle 93, and retainer 96—is grounded by contact with adapter 111 via spring contact 112. Capillary section 98 together with cap 97 and union 99 are held at a high potential via metal coating 30A on capillary section 233.

Depicted in FIG. 10 is nanospray assembly 90 as it is inserted into spray chamber 240 of a complete ionization source designed according to co-pending application IONIZATION SOURCE FOR MASS SPECTROMETRY. During normal operation of preferred embodiment nanospray assembly 90, sample solution is formed into droplets at atmospheric pressure by spraying the sample solution from spray needle 93 into spray chamber 240. The spray is induced by the application of a high potential between spray needle 93 and entrance cap 97 within spray chamber 240. Sample droplets from the spray evaporate while in spray chamber 240 thereby leaving behind an ionized sample material (i.e., sample ions). These sample ions are accelerated toward capillary inlet 126 of capillary section 98 by the electric field between spray needle 93, entrance cap 97 and inlet 126 of first section 98 of capillary 235 and by the flow of gas towards and into inlet 126. The design of entrance cap 97 provides the additional advantage over prior art nanospray devices that the gas flow through hole 105 tends to focus ions into inlet 126. That is, gas flow in the nanospray assembly according to the present invention is well controlled. All gas entering channel 113 must flow through hole 105. Because needle tip 104 is inserted into hole 105 for normal operation, ions produced at tip 104 are immediately entrained in the gas flow and transported to and through channel 113. As a result, the position of spray needle 93 within the assembly is again less critical than in prior art devices.

The ions are transported through first channel 113 into and through second channel 232 to capillary outlet 234. As described above first section 98 is joined to second section 233 in a sealed manner by union 99. The flow of gas created by the pressure differential between spray chamber 240 and first transfer region 245 further causes ions to flow through the capillary channels from the spray chamber toward exit elements 255 and the mass analyzer (not shown).

Still referring to FIG. 9, first transfer region 245 is formed by mounting flange 248 on source block 254 where a vacuum tight seal is formed between flange 248 and source block 254 by o-ring 258. Capillary 235 penetrates through a hole in flange 248 where another vacuum tight seal is maintained (i.e., between flange 248 and capillary 235) by o-ring 256. A vacuum is then generated and maintained in first transfer 245 by a pump (e.g., a roughing pump, etc., not shown). The inner diameter and length of capillary 235 and the pumping speed of the pump are selected to provide as high a rate of gas flow through capillary 235 as reasonably possible while maintaining a pressure of 1 mbar in the first transfer region 245. A higher gas flow rate through capillary 235 will result in more efficient transport of ions.

Next, as further shown in FIG. 9, first skimmer 251 is placed adjacent to capillary exit 234 within first transfer region 245. An electric potential between capillary outlet end 234 and first skimmer 251 accelerates the sample ions toward first skimmer 251. A fraction of the sample ions then pass through an opening in first skimmer 251 and into second pumping region 243 where pre-hexapole 249 is positioned to guide the sample ions from the first skimmer 251 to second skimmer 252. Second pumping region 243 is pumped to a lower pressure than first transfer region 245 by pump 253. Again, a fraction of the sample ions pass through an opening in second skimmer 252 and into third pumping region 244, which is pumped to a lower pressure than second pumping region 243 via pump 253.

Once in third pumping region 244, the sample ions are guided from second skimmer 252 to exit electrodes 255 by hexapole 250. While in hexapole 250 ions undergo collisions with a gas (i.e., a collisional gas) and are thereby cooled to thermal velocities. The ions then reach exit electrodes 255 and are accelerated from the ionization source into the mass analyzer (not shown) for subsequent analysis.

Figure 11A:
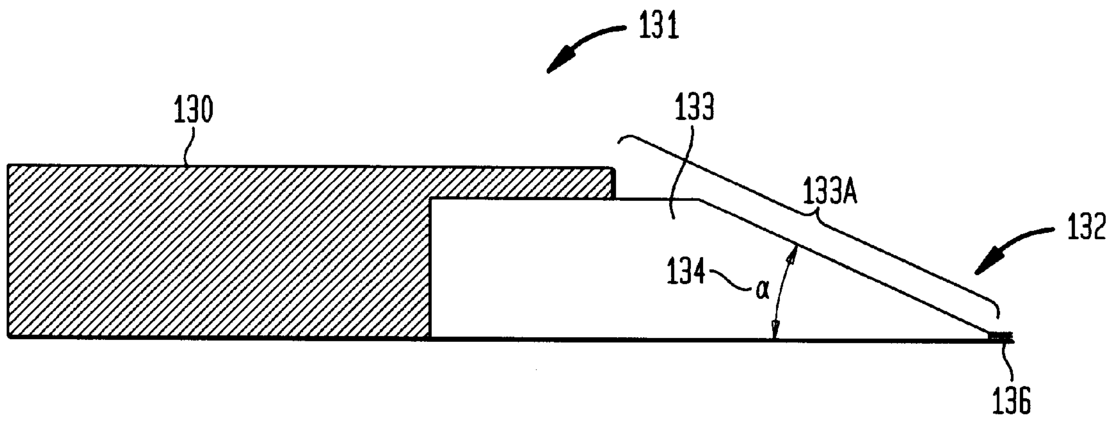
FIG. 11A shows a side view of a yet another alternate embodiment of a spray needle according to the present invention.
Figure 11B:
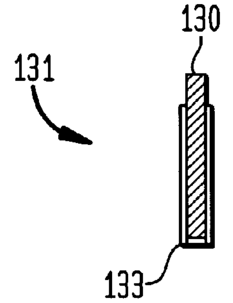
FIG. 11B shows an end view of the spray needle depicted in FIG. 11A.
Figure 11C:
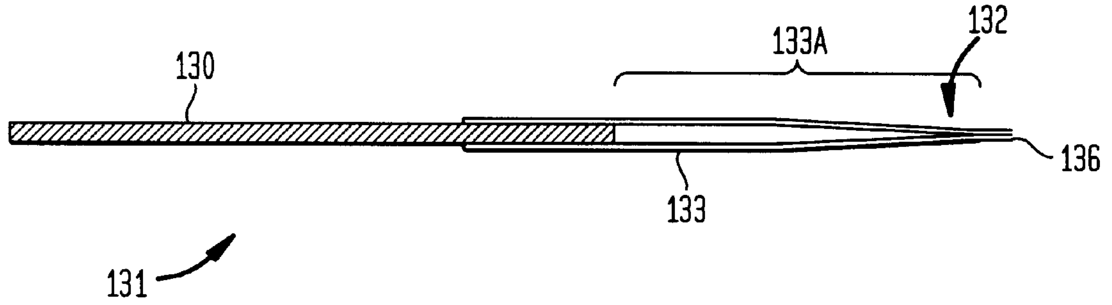
FIG. 11C shows a top plan view of the spray needle depicted in FIG. 11A;.

Referring lastly to FIGS. 11A–C, shown is yet another alternative embodiment of a spray needle according to the invention, wherein spray needle 131 further comprises a multiple element tip (or "multi-tip"). As shown, spray needle 131, similar to the preferred embodiment of the invention shown in FIGS. 5A–C, comprises two component parts, support 130 and foil 133. Support 130 is preferably constructed from a rigid and electrically conductive material (e.g., steel, etc.). It is also preferred that the support 30 be a solid yet thin structure (i.e., on the order of 400 $\mu$m or less in thickness). The thickness of the support contributes to the determination of the loading and spray properties of the sprayer (i.e., how fast the solution will flow into the sprayer, the potential at which the sprayer must be operated, the optimal distance between the sprayer and ESI orifice, and the solution flow rate during spray etc.), because the thickness of support 130 determines the size of foil 133. It is further preferred, as shown in FIG. 11B, that support 130 have a rectangular cross section. This geometry eases the elimination of voids or bubbles which interfere with the spray of the solution. However, support 30 may have a different cross-sectional shape (e.g., triangular, circular, hexagonal, etc.). Such change in the shape of support 130, however, may alter the spray properties of the sprayer. Thus, different structures may be ideal for different sample solutions.

Generally, foil 133 may be constructed using a piece of electrically conducting "foil" which is cut at an angle $\alpha$, as shown in FIG. 11A. In this embodiment, foil 133 is attached to the outer surface of support 130 at one end of support 130, as depicted in FIGS. 11A and 11C. Foil 133 is attached such that it is in electrical contact with support 130. Preferably, an adhesive is used to attach foil 133 to support 130, but other means for attaching foil 133 to support 130 may be used, such as soldering, etc.

Foil 133 is preferably constructed from a chemically inert and easily cleaned material (e.g., gold, copper, platinum, stainless steel (because of its limited reactivity to certain compounds), etc.). For example, certain species are not readily protonated, but will accept, for example, silver or copper ions as adducts. Therefore, use of such different materials for foil 133 may alter the life and spray properties of the spray needle 131, as described above with respect to the preferred embodiment. Of course, other materials might be used in the construction of foil 133, depending on the particular electrochemical or reactive properties desired (e.g., the use of copper instead of gold for foil 133 may result in the formation of copper ions, thus having the potential for forming complexes with analyte species) in order to enhance signal intensity in certain analyses.

As described above for the preferred embodiment, it is preferred that foil 133 be constructed from a very thin piece of metal (i.e., about 100 μm in thickness). However, the thickness, particular metal, etc., used for foil 133 may be chosen based on the desired properties (i.e., durability, formation, spray type, etc.).

Importantly, spray needle 131 according to this alternate embodiment of the invention, as shown in FIGS. 11A–C, comprises tip 132 which, as previously described, may be formed by wrapping or folding a portion of foil 133 around one end of support 130 and affixing foil 133 thereto. Once wrapped or folded, the exposed end of foil 133 is preferably cut at an angle α 134 as shown in FIG. 11A, thereby forming tip 132. In addition, tip 132 may have a plurality of (i.e., 20, 50, 100, etc.) extremely fine elements 136 (i.e., on the order of 50 μm or less) extending slightly therefrom. Preferably, these fine elements 136 are individual elements positioned lengthwise within foil 133, as shown in FIG. 11C. During use of such spray needle 131, the sample solution is sprayed from each of these individual fine elements 136, thereby resulting in a very fine spray of sample solution, which minimizes the amount of solution lost (i.e., not introduced into the analyzer). Alternatively, tip 132 may be designed such that it comprises a plurality of tips, rather than the additional fine elements 136 being positioned withing foil 133. Alternatively, the individual fine elements 136 may be incorporated into the embodiments depicted in FIGS. 6A–C & 7A–C in a manner similar to that shown and described for FIGS. 11A–C.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. An apparatus for the introduction of sample into a mass analyzer, said apparatus comprising:

a support component having a first end and a second end, said support component having a longitudinal bore therethrough; and a tip component configured to form trough-like region having proximal and distal ends, said tip component having first and second surfaces;

wherein said proximal end of said tip component is attached to said second end of said support component such that said longitudinal bore is coaxial with said trough-like region.

2. An apparatus according to claim 1, wherein said first surface of said tip component is affixed to said support component at said second end.

3. An apparatus according to claim 1, wherein said tip component comprises an electrically conducting foil.

4. An apparatus according to claim 1, wherein said tip component is thin.

5. An apparatus according to claim 1, wherein said tip component has a width of approximately 100 microns.

6. An apparatus according to claim 1, wherein said tip component is constructed from a chemically inert material.

7. An apparatus according to claim 6, wherein said chemically inert material is selected from the group consisting of gold, platinum and stainless steel.

8. An apparatus according to claim 1, wherein said tip component is shaped and positioned such that said trough-like region is tapered from said proximal end thereof to said distal end thereof.

9. An apparatus according to claim 1, wherein said support component comprises a rigid material.

10. An apparatus according to claim 1, wherein said support component comprises an electrically conductive material.

11. An apparatus according to claim 10, wherein said material is steel.

12. An apparatus according to claim 1, wherein said support component has a thickness of approximately equal to or less than 400 microns.

13. An apparatus according to claim 1, wherein said support component has a rectangular cross section.

14. An apparatus according, to claim 1, wherein said support component has a circular cross section.

15. An apparatus according to claim 1, wherein said support component has a triangular cross section.

16. An apparatus according to claim 8, wherein said tip component is configured at said second end with an angle α in relation to an axis of said trough-like region.

17. An apparatus according to claim 16, such that said angle α is within the range of 0 to 90 degrees.

18. An apparatus according to claim 16, such that said angle α is within the range of 30 to 60 degrees.

19. An apparatus according to claim 8, wherein said proximal end of said tip component is attached to said second end of said support component.

20. An apparatus according to claim 8, wherein said distal end is constructed by cutting said second component at an angle α in relation to said trough-like region.

21. An apparatus according to claim 20, such that said angle α is within the range of 0 to 90 degrees.

22. An apparatus according to claim 20, such that said angle α is within the range of 30 to 60 degrees.

23. An apparatus according to claim 8, wherein said distal end is narrower than said proximal end.

24. An apparatus according to claim 8, wherein said distal end has a width of approximately 200 microns.

25. An apparatus according to claim 8, wherein said distal end has a width in the range of approximately 20 to 50 microns.

26. An apparatus according to claim 8, wherein said distal end has an opening having a width of approximately 5 microns.

27. An apparatus according to claim 8, wherein said distal end culminates in an angled point tip.

28. An apparatus according to claim 8, wherein said distal end culminates in curved tip.

29. An apparatus according to claim 8, wherein sample is introduced from said apparatus into said mass analyzer at said distal end.

30. An apparatus according to claim 1, wherein said tip component is coated with a polymer.

31. An improved spray needle for the introduction of liquid sample into a mass analyzer, said spray needle comprising a generally cylindrical tube having first and second ends and a longitudinal bore therethrough from said first end to said second end, wherein along a side-wall of said tube is an aperture in a direction parallel to the axis of said longitudinal bore extending from said second end to a point near said first end.

32. An apparatus according to claim 31, wherein said needle comprises a rigid material.

33. An apparatus according to claim 31, wherein said needle comprises an electrically conductive material.

34. An apparatus according to claim 31, wherein said needle has a thickness of approximately 400 microns.

35. An apparatus according to claim 31, wherein said needle has a circular cross section.

36. An apparatus according to claim 31, wherein said first end culminates in a tip and said second end culminates in an opening.

37. An apparatus according to claim 36, wherein said tip comprises a hole.

38. An apparatus according to claim 37, wherein said hole is approximately 200 microns in diameter.

39. An apparatus according to claim 37, wherein said hole has a diameter in the range of approximately 20 to 50 microns.

40. An apparatus according to claim 37, wherein said hole has a diameter of approximately 5 microns.

41. An apparatus according to claim 31, wherein sample is introduced from said needle into said mass analyzer at said first end.

42. An apparatus for an improved spray needle for the introduction of liquid sample into a mass analyzer, said spray needle comprising a generally cylindrical tube having first and second ends and a longitudinal bore therethrough from said first end to said second end, wherein along a side-wall of said tube is a plurality of apertures aligned parallel to the axis of said longitudinal bore extending from said second end to a point near said first end.

43. An apparatus according to claim 42, wherein said needle comprises a rigid material.

44. An apparatus according to claim 42, wherein said needle comprises an electrically conductive material.

45. An apparatus according to claim 42, wherein said needle has a thickness of approximately 400 microns.

46. An apparatus according to claim 42, wherein said needle has a circular cross section.

47. An apparatus according to claim 32, wherein said first end culminates in a tip and said second end culminates in an opening.

48. An apparatus according to claim 47, wherein said tip comprises a hole.

49. An apparatus according to claim 48, wherein said hole is approximately 200 microns in diameter.

50. An apparatus according to claim 48, wherein said hole has a diameter in the range of approximately 20 to 50 microns.

51. An apparatus according to claim 48, wherein said hole has a diameter of approximately 5 microns.

52. An apparatus according to claim 42, wherein sample is introduced from said needle into said mass analyzer at said first end.

53. An electrospray needle for the introduction of liquid sample into a mass analyzer, said needle comprising:

a rigid support having a first end and a second end, said rigid support having a longitudinal bore therethrough;, a tip element having a distal end and a proximal end, and a longitudinal trough-like region; and a plurality of fine elements;

wherein said proximal end of said tip element is attached to said second end of said rigid support such that said rigid support is positioned coaxial with said longitudinal bore, and wherein said plurality of fine elements are positioned within said longitudinal trough-like region such that said fine elements extend therefrom.

54. An electrospray needle according to claim 53, wherein said tip element comprises an electrically conducting foil.

55. An electrospray needle according to claim 54, wherein said electrically conducting foil is thin.

56. An electrospray needle according to claim 53, wherein said tip element has a width of approximately 100 microns.

57. An electrospray needle according to claim 53, wherein said tip element is constructed from a chemically inert material.

58. An electrospray needle according to claim 57, wherein said chemically inert material is selected from the group consisting of gold, platinum and stainless steel.

59. An electrospray needle according to claim 53, wherein said tip element is shaped and positioned such that said longitudinal trough-like region is tapered from said proximal end to said distal end.

60. An electrospray needle according to claim 53, wherein said support comprises a rigid material.

61. An electrospray needle according to claim 53, wherein said support comprises an electrically conductive material.

62. An electrospray needle according to claim 61, wherein said electrically conductive material is steel.

63. An electrospray needle according to claim 53, wherein said support has a thickness of approximately equal to or less than 400 microns.

64. An electrospray needle according to claim 53, wherein said support has a rectangular cross section.

65. An electrospray needle according to claim 53, wherein said first component has a circular cross section.

66. An electrospray needle according to claim 53, wherein said support has a triangular cross section.

67. An electrospray needle according to claim 53, wherein said distal end of said tip element is cut at an angle $\alpha$ in relation to said longitudinal trough-like region.

68. An electrospray needle according to claim 67, such that said angle $\alpha$ is within the range of 0 to 90 degrees.

69. An electrospray needle according to claim 53, wherein said distal end of said trough-like region is narrower than said proximal end of said trough-like region.

70. An electrospray needle according to claim 53, wherein said distal end of said trough-like region has a width of approximately 200 microns.

71. An electrospray needle according to claim 53, wherein said distal end of said trough-like region has a width in the range of approximately 20 to 50 microns.

72. An electrospray needle according to claim 53, wherein said distal end has an opening having has a width of approximately 5 microns.

73. An electrospray needle according to claim 53, wherein said distal end culminates in an angled point tip.

74. An electrospray needle according to claim 53, wherein said distal end culminates in an curved tip.

75. An electrospray needle according to claim 53, wherein said sample is introduced from said needle into said mass analyzer at said distal end.

76. An electrospray needle according to claim 53, wherein said tip element is coated with a polymer.

77. An apparatus according to claim 53, wherein said second component is coated with a polymer.

* * * * *